R. H. MARTINDALE.
Thrashing-Machines.

No. 141,153.  Patented July 22, 1873.

Witnesses.
E. R. Bates.
Cha. B. Steele

Inventor.
R. H. Martindale
Chipman Hosmer & Co
Attys

UNITED STATES PATENT OFFICE.

RALPH H. MARTINDALE, OF HOBBIEVILLE, INDIANA.

IMPROVEMENT IN THRASHING-MACHINES.

Specification forming part of Letters Patent No. 141,153, dated July 22, 1873; application filed May 10, 1873.

*To all whom it may concern:*

Be it known that I, RALPH H. MARTINDALE, of Hobbieville, in the county of Greene and State of Indiana, have invented a new and valuable Improvement in Thrashing and Stacking Machines; and I do hereby declare that the following is a full, clear, and exact description of the construction and operation of the same, reference being had to the annexed drawings making a part of this specification, and to the letters and figures of reference marked thereon.

Figure 1:
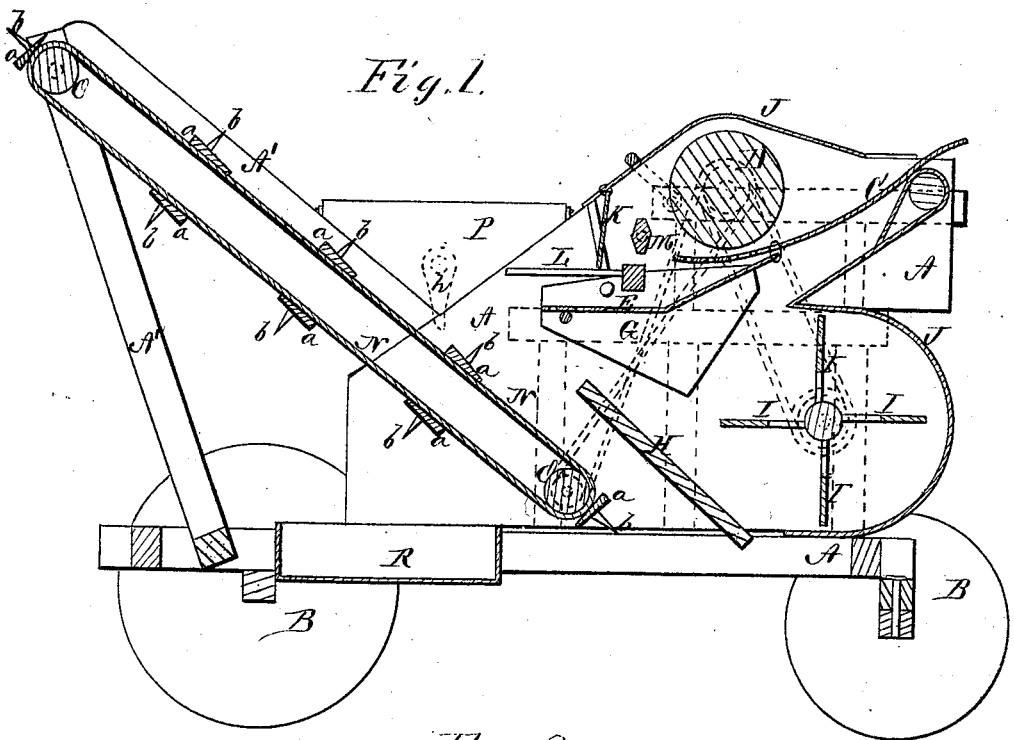
Figure 2:
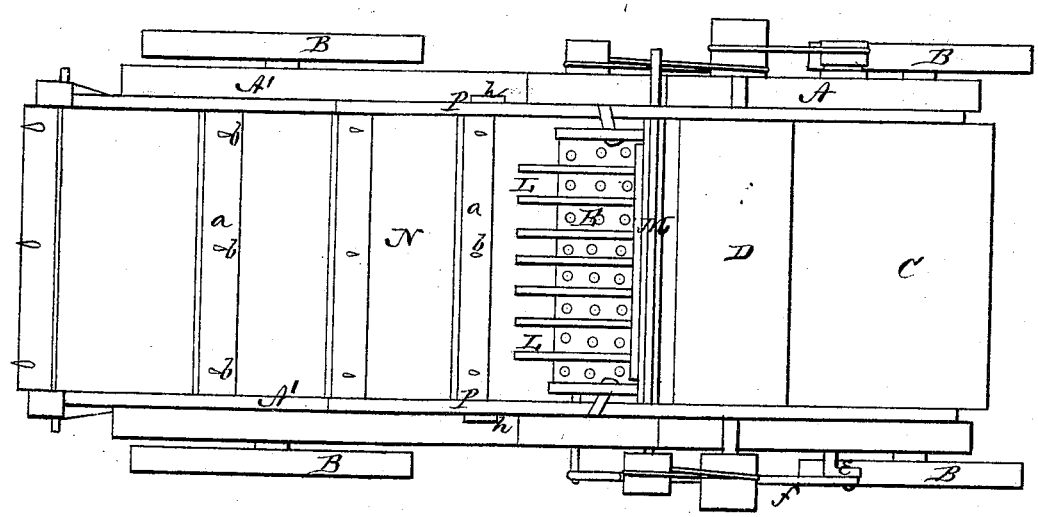

Figure 1 of the drawings is a representation of my machine in longitudinal vertical section, and Fig. 2 is a plan view of the same.

The nature of my invention consists in the novel arrangement of a swinging grain-board, rake, and revolving beater, as hereinafter more fully described and claimed.

In order to enable others skilled in the art to which my invention appertains to make and use the same, I will now proceed to describe its construction and operation.

Like letters of reference in the several figures indicate corresponding parts.

A represents the frame of my machine mounted upon wheels B B, as shown. C is the feed-table, over which the straw and grain are fed to be acted upon by an ordinary thrashing-cylinder, D, the grain passing through perforations in the inner end of the feed-table, which extends under and slightly beyond the thrashing-cylinder. The grain then falls on a sieve, E, in a vibrating shoe, G, and from said sieve onto an inclined board, H, and out at the bottom of the machine. During the passage of the grain, as above described, it is acted upon by a steady and continuous blast of air from the fan I, arranged below and in front of the thrashing-cylinder and shoe. These parts are entirely covered by a casing, J, at the rear end of which is hung a grain-board, K, extending down to a rake, L, in the vibrating shoe G. Above the inner end of this rake L, and between the thrashing-cylinder and the swinging grain-board K, is a revolving grain-beater, M, which beats the straw as it passes onto the rake, causing any grain that remains in the straw to be taken out and fall down upon the sieve E. The straw, upon leaving the rake L, falls upon the endless apron N, which passes around two rollers, O O, arranged in an inclined frame, A', upon the main frame A. This apron N is, at suitable intervals, provided with cross slats or cleats a a, upon which are teeth b b, so that the straw, as it falls down upon this apron, will be carried up and be deposited or stacked at the rear end of the machine. The fan I, thrashing-cylinder D, and the lower roller O, are connected by suitable ropes or belts passing around pulleys on their respective shafts, and power is communicated to them by any suitable means. The shoe G is vibrated by means of a crank, e, on the fan-shaft, connected by a rod, f, with the shoe. On each side of the angle, between the main frame A and stacker-frame A', is hung a shutter, P, fastened by a button, h, to keep the straw in and prevent it from falling off on the sides. In the bottom of the main frame A is a box, R, for carrying stakes and other tools and utensils.

What I claim as new, and desire to secure by Letters Patent, is—

The arrangement of the revolving beater M, swinging grain-board K, and rake L, substantially as and for the purposes herein set forth.

In testimony that I claim the above I have hereunto subscribed my name in the presence of two witnesses.

RALPH H. MARTINDALE.

Witnesses:
WILLIAM T. KING,
RICHARD G. WALKER.